(12) United States Patent
Kasparian et al.

(10) Patent No.: US 7,008,538 B2
(45) Date of Patent: Mar. 7, 2006

(54) SINGLE VESSEL MULTI-ZONE WASTEWATER BIO-TREATMENT SYSTEM

(76) Inventors: Kaspar A. Kasparian, 4701 Scollay Ct., Raleigh, NC (US) 27609; Eric Verret, 10755, Avenue du Sacre-Coeur, Montreal, QC (CA) H2C 2T2

( * ) Notice: Subject to any disclaimer, the term of this patent is extended or adjusted under 35 U.S.C. 154(b) by 336 days.

(21) Appl. No.: 10/644,404

(22) Filed: Aug. 20, 2003

(65) Prior Publication Data

US 2005/0040107 A1    Feb. 24, 2005

(51) Int. Cl.
*C02F 3/00* (2006.01)
(52) U.S. Cl. ............... 210/610; 210/629; 210/630; 210/209; 210/220
(58) Field of Classification Search ............... 210/610, 210/629, 630, 209, 220
See application file for complete search history.

(56) References Cited

U.S. PATENT DOCUMENTS 6,787,035 B1 *  9/2004  Wang ................. 210/620

* cited by examiner

Primary Examiner—Chester T. Barry
(74) Attorney, Agent, or Firm—Mills Law Firm PLLC

(57) ABSTRACT

A process for treating wastewater and a system for practicing the process includes: providing a plurality of zones within a single vessel wastewater treatment system; feeding wastewater into the system; maintaining an aerobic zone in the upper central portion of the vessel; feeding air into the aerobic zone for oxygenation and creating an upflow; maintaining an annularly disposed anoxic zone about said aerobic zone; causing the upflow from the aerobic zone to produce a downflow in the anoxic zone; causing at least a portion of the downflow from the anoxic zone to pass into the upflow of the aerobic zone; maintaining an annularly disposed clarification zone about said anoxic zone for clarified liquid, including an upflow; causing at least a portion of the downflow from the anoxic zone to pass into the upflow of the clarification zone; maintaining a facultative transition zone below the upper aerobic, anoxic and clarification zones; maintaining an anaerobic zone below the facultative zone for absorbing solids settled by gravity and synthesizing volatile fatty acids; withdrawing substantially clarified liquid from the upflow of the clarified liquid zone; withdrawing substantially solids from about the bottom of the anaerobic zone; employing the aerobic zone for breaking down carbon chains and oxidizing volatile fatty acids dispersed from the anaerobic zone; interacting the aerobic and anoxic zones for the removal of nitrates; and interacting the aerobic, anaerobic ananoxic zones for the removal of phosphorus.

23 Claims, 4 Drawing Sheets

SINGLE VESSEL MULTI-ZONE WASTEWATER BIO-TREATMENT SYSTEM

FIELD OF THE INVENTION

This invention relates to a biological process for treating wastewater, including processing the wastewater to reduce its waste strength to desirable levels for ground water return or better, reducing the total amount of suspended solids in the wastewater to acceptable levels, and removing harmful nitrogen and phosphorous nutrients from the wastewater. The invention also relates to a practical system and method for performing the process.

DESCRIPTION OF PRIOR ART

Traditionally, it has been the overall objective of wastewater treatment to prevent the pollution of surface waters by decreasing the amount of suspended solids, decrease the BOD (Biochemical Oxygen Demand normally measured in milligrams per liter and also referred to as BOD-5 signifying measurements over 5 days) in the final effluent and also decrease of the nitrogen and phosphorus compounds in the final effluent. Another important objective was the reduction of pathogens responsible for diseases. Further definitions for terms used herein are set forth in the definitions attached at the end of the written description.

Wastewater treatment typically includes primary, secondary and tertiary treatment. Typically, during primary treatment, floating materials are screened out; sandy materials are removed; oil and grease is skimmed off; floating materials are shredded and ground; and, finally, solid materials are settled out in sedimentation tanks. In this stage of treatment, biological activity is not particularly important, although some digestion of sludge and dissolved organic matter can occur during long holding times.

During secondary treatment, the sewage effluent from primary treatment has typically been biologically processed using either an activated sludge process or a trickling filter process. The objective of secondary treatment has traditionally been the reduction of most of the BOD and, in some systems (e.g., the Bardenpho system), the reduction of nitrogen and phosphorus.

Tertiary treatment has traditionally included abiotic treatments (eg. chemical addition and filtering) that further remove BOD, harmful nutrients, pathogens and some toxic compounds. Phosphorus, e.g., was typically precipitated out to calcium phosphate through liming and small particulate organic matter was typically removed with sand and charcoal filters. Further, sludge from primary or secondary treatment is typically transferred to an anaerobic sludge digester, so as to reduce the total mass of the sludge, reduce odors and other offensive characteristics and to decrease the population of pathogens residing therein. In the activated sludge process, air or pure oxygen is added to the effluent coming from primary treatment. Under these conditions, a conglomerate of metabolizing microbes consisting of bacteria, fungi and protozoa (e.g., a floc) is visible. The formation of the floc is desirable, since it reduces BOD, suspended solids and colloidal materials (e.g., clay) from the effluent. The floc may also be important in reducing the concentration of nitrogen and phosphorus in the effluent. A good floc may be characterized by its capacity to adsorb substrates, to assimilate and oxidize organic matter, to oxidize nitrogen compounds and to settle out along with the majority of organic matter and colloidal materials. As a floc settles, it reduces BOD, suspended solids and colloidal materials, such as clay from the effluent. Under aerobic conditions, the most abundant bacteria in the floc is usually thought to be *Zooglea* such as, chemoorganoheterotrophs. However, chemolithoautotrophs, such as the nitrifyers, (e.g., *nitrosomonas* and *nitrobacter*) are common. Protozoa are important in the constitution of a floc since they contribute to its structure and reduce effluent turbidity. The most common of these types of protozoa are cilliates but amoeba are also present. Bulking refers to the condition where a floc is bulky and loosely compacted. This condition prevents the floc from settling and is commonly associated with an overabundance of filamentous bacteria such as *Sphaerotilus* and *Thiothrix*. Bulking is particularly undesirable since large quantities of the floc may be associated with final effluent due primarily to it.

In recent years, there has been an increasing recognition by environmental protection professions of the adverse impact caused by the discharge of nitrogen and phosphorus nutrients to aquatic environments. Ammonia-nitrogen discharges can result in increased oxygen demand in the receiving stream, as well as depressed dissolved oxygen concentrations. Ammonia-nitrogen can also be toxic to aquatic organisms. Nitrite-nitrogen can also be toxic. Nitrogen and phosphorus discharges can enrich receiving water bodies, resulting in the undesirable growth of algae and other aquatic plants, which is known as eutrophication. In an effort to address this problem, the Bardenpho Process was developed. This process primarily involves the modification of conventional secondary treatment to include steps for the removal of nitrogen and phosphorous. See, e.g., Barnard, J. L. (1978) *The Bardenpho process, In Advances In Water and Wastewater Treatment, Biological Nutrient Removal* (eds. M. P. Wanielista and W. W. Eckenfelder), Ann Arbor Science, pp. 79–114.

The use of microorganisms (e.g., bacteria contained in an activated sludge) in the breakdown of organic wastes in influent streams, while simultaneously removing nutrients (the term 'nutrient' in wastewater context normally refers primarily to undesirable Phosphorus and Nitrates), has now gained almost universal acceptance in the field of sewage treatment. This raw sewage has a relatively high biological oxygen demand (BOD), and the breakdown products are typically lower molecular weight volatile fatty acids (VFA) such as acetic, propionic or butyric acids. The composition is also high in suspended solids. Nitrogen is present as ammonia and organic and phosphorous is present as inorganic phosphates.

It is known that the naturally occurring populations of microorganisms found in activated sludge are highly diverse, and represent a spectrum of genera ranging from strict aerobes to facultative anaerobes to obligate anaerobes. Each of these classes of organisms under appropriate manipulation can achieve some objective of the waste treatment process. Increasingly, it has become an objective of wastewater treatment processes to remove undesirable nutrients such as total nitrogen including organic nitrogen, ammonia nitrogen, and oxidized nitrogen and phosphates, in addition to achieving removal of organic matter, which can affect delicate ecological balances. An understanding of the metabolism and catabolism of different classes of microbes has led to the design of various treatment protocols taking advantage of these natural processes.

Organic compounds provide food for bacterial growth. The organics, both simple and complex, contained in wastewater, fuel this growth. Under aerobic conditions, three types of metabolism can occur: (1) substrate oxidation in which organic compounds are converted to carbon dioxide and water; (2) synthesis in which organic compounds and nutrients are converted to cell protoplasm; and (3) endogenous respiration in which protoplasm is converted to carbon dioxide, nutrients, and water, as described in Metcalf & Eddy, Waste Water Engineering, 3rd ed., McGraw-Hill: 1991. In addition, energy and a metabolizable carbon source are also needed for nutrient utilization. Under anaerobic conditions, organic compounds can be further fermented to VFAs (Volatile Fatty Acids), primarily by anaerobic and facultative species. The two principal undesirable nutrients requiring removal from wastewater are inorganic phosphate and nitrogenous compounds. Influent wastewater typically contains organic nitrogen and ammonia in the form of ammonium ($NH_4^+$). Hydrolysis of organic nitrogen and conversion of ammonia to free nitrogen gas ($N_2$), which can readily be stripped from solution to the atmosphere, requires two distinct processes. During nitrification, ammonia is converted first to nitrite ($NO_2^-$) by autotrophic oxidation involving *Nitrosomonas* spp. and related organisms, followed by further oxidation to nitrate ($NO_3^-$) involving *Nitrobacter* spp. A relatively broad range of heterotrophic facultative organisms then convert nitrate to free nitrogen ($N_2$) in a series of steps. The basic multi-step process for nitrification and denitrification is set forth in the following reactions:

Nitrification:

$$NH_4 + 1.5\ O_2 \rightarrow NO_2 + 2H^+ + H_2O \quad (1)$$

(*Nitrosomonas*)

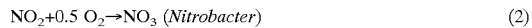
$$NO_2 + 0.5\ O_2 \rightarrow NO_3\ (\textit{Nitrobacter}) \quad (2)$$

Denitrification:

$$NO_3 + \text{organic carbon} \rightarrow N_2 + CO_2 + OH^-\ (\text{facult.}) \quad (3)$$

Studies have shown that step (1) is rate limiting for nitrification and that *Nitrobacter* converts $NO_2^-$ as an electron acceptor very quickly to $NO_3^-$. Meanwhile, denitrification is dependent on the availability of organic carbon sources. It will be apparent that the nitrogen removal process requires first an aerobic step in which oxidation of ammonia to nitrate occurs (nitrification), followed by an anoxic step in which anoxic organisms convert nitrate and nitrite to free nitrogen, which can be released (denitrification). The earliest and most basic biological water treatment utilized constant aeration. There are of two treatment methods: fill, reactions and draw, and conventional flow through reaction followed by settling.

In more recent fill, reactions and draw processes, wastewater undergoes alternating anaerobic/anoxic and aerobic phases to attain carbonaceous organic oxidation, nitrification, and denitrification. After a settling phase, the clarified water is drawn off. In a multi-cell approach, primary clarified water is mixed with activated sludge to form mixed liquor, which is then passed through multiple aerobic/anoxic cells in a continuous flow process, and finally it enters a secondary clarifier. A portion of the sludge that settles out is returned to be mixed with wastewater to form the mixed liquor. The aeration step helps to create biomass under the two aerobic processes outlined above and also to nitrify ammonia. Denitrification then occurs to some extent upon establishment of anoxic conditions in the anoxic cells and secondary clarifier. In the latter, denitrification depends only on endogenous respiration.

Phosphorous Removal

Modern systems also seek to remove phosphorus species while simultaneously exchanging VFAs (Volatile Fatty Acids) for phosphates. Removal of phosphates occurs in two steps. It is mediated by a group of phosphorous-rich microorganisms (Bio-P), principally *Acinetobacter* spp. and some *Aeromonas*. These organisms, when present in sludge passing through an anaerobic zone, use stored energy in the form of poly-phosphate to absorb food materials, principally VFA, and store it as poly-□-hydroxybutyrate (PHB). In the process, the organisms release phosphates as the polyphosphates are broken down to release energy. This treatment zone must be anaerobic rather than anoxic, so that it is depleted of nitrates which would otherwise inhibit phosphate release and VFA absorption by the microorganism. Occasionally, raw wastewater contains oxidized nitrogen species that may inhibit the process.

In the second step of phosphate removal, the aerobic bacteria contained in the sludge now moving through an aerobic zone metabolize the PHB and take up phosphates as biomass increases. Since more phosphate is taken up by the Bio-P organisms than was previously released, the difference is known as luxury uptake. In many conventional processes, VFAs from primary sludge fermentation are added to provide a carbon source for growth, and a low molecular weight carbonaceous compound such as acetic acid or methanol is added to provide an organic carbon source during denitrification. As cell growth depletes the absorbed organic carbon source with concomitant phosphorus uptake, the organisms switch to endogenous respiration with formation of flocks of senescent cells that settle out typically in a secondary clarifier.

The metabolic characteristics of these classes of organisms have been exploited in configuring a number of industrial processes designed to improve the efficiency of wastewater treatment. In the basic A/O system (a single-sludge suspended growth system that combines anaerobic and aerobic sections in sequence), two successive tanks or basins are provided. Influent water first undergoes an anaerobic digestion step in which organics are fermented to VFAs along with phosphorous release and VFA absorption, followed by an aerobic step in a separate tank. The effluent is then further purified by settling in a clarifier. From a nutrient standpoint, denitrification can occur in the first tank, with further nitrification of ammonia and stripping of nitrogen gas in the second tank. In this process, the recycling of sludge is important for two reasons: the biomass acts as a source of mixed liquor in the first tank and the recycled nitrates are denitrified. Phosphates are released under the anaerobic conditions of the first tank, and taken up under the aerobic conditions in the second tank. Examples of a basic A/O type process are disclosed in U.S. Pat. No. 4,162,153 (Spector) and U.S. Pat. No. 4,522,722 (Nicholas).

Even though there is a coupling of anaerobic and aerobic processes, this system is relatively inefficient, with large volumes of fluid and long retention (treatment) times. Inorganics, undesirable nutrients and organic matter escape into the clarifier because not all of the dissolved material is distributed properly.

Another source of inefficiency is the constant dilution of raw material in the anaerobic tank with recycled sludge containing oxidized nitrogen and new influent.

There are many modifications of the basic A/O type process, which can generally be divided into linear versus sequencing (nonlinear) categories. Variations of the A/O linear configuration include the $A^2O$ process which includes separate anaerobic, anoxic, and aerobic zones with two recycle loops, one from the final clarifier to the anaerobic zone, and one from the aerobic outlet to the anoxic zone. The $A^2O$ system splits the anaerobic and aerobic zones to several cells, and is very similar to the Bardenpho process. The advantage of this system is that it does not compromise the anaerobic zone by recycling material containing high levels of nitrates. Rather the high nitrate material is returned to anoxic conditions for denitrification. The five stage Bardenpho process adds a second anoxic and aerobic zone in series to the anaerobic, anoxic and aerobic $A^2O$ system, but retains the $A^2O$ recycle loops. While theoretically increasing the capacity of the system, it also has the advantage of combining the nutrient/BOD reducing recycle steps with a separate anoxic, aerobic cycle that treats the entire effluent volume.

Other linearly configured treatment systems employ a second oxic cell after settling and prior to mixing to form mixed liquor. U.S. Pat. No. 4,488,967 (Block) contains a number of linear treatment cells connected by bottom-disposed apertures. U.S. Pat. No. 4,650,585 (Hong) has a series of anaerobic cells and aerobic cells that are interconnected within a treatment series by bottom disposed apertures, but where the anaerobic cell series is connected to the aerobic series by a top disposed aperture, which in turn communicates through a top aperture with a clarifier. An interesting variation is disclosed in U.S. Pat. No. 5,160,043 (Kos) in which recycled sludge from the oxic tank is returned to the anaerobic tank after being retained in an exhaust tank to deplete nitrate levels. Another more complex linear-type system is disclosed in U.S. Pat. No. 5,213,681 (Kos) in which a series of anaerobic/aerobic treatment loops containing an exhaust tank are connected together in series with a terminal recycle after clarification.

In the alternating or sequencing reactor systems, mixed liquor or treatment sludge can be directed to more than one tank destination at various times. Thus, a given tank can carry out one treatment process in one-step and another treatment process in a different step. There is generally a more efficient use of equipment because each tank or treatment cell is not dedicated to a single treatment step. This provides for flexibility in designing treatment protocols, especially in varying treatment times for different steps in response to the content of the influent.

An early sequencing system is disclosed in U.S. Pat. No. 3,977,965 (Tholander) in which influent is directed to one of two raceways interconnected by a valved conduit. Water entering one raceway can be treated under an aerobic or anaerobic condition as desired, passed to the second raceway also capable of varied treatment and then discharged to a large clarifier. In a second cycle, influent is directed to the second raceway, passed to the first and is discharged to the same clarifier. These systems are also known as DE-Ditch processes when influent and mixed liquor is first conditioned in an anaerobic tank. In a variation, a clarifier can be eliminated by using, alternatively, one or the other ditch as a settling container, with clarified water being discharged over an adjustable weir. An advantage of the process is the creation of an anoxic zone in a non-aerated ditch, while providing a carbon source for denitrification, in this case by adding influent wastewater containing degradable carbon.

U.S. Pat. No. 5,228,996 (Lansdell) discloses an alternating system having three series of cells linearly interconnected for continuous flow operation in which two of the three cell series are operated aerobically at any given time and one series operates anoxically. At each treatment cycle, a different set of two series is aerobic, and the other set is quiescent for settling. The system operates without a separate clarifier, and is not equipped with a sludge return. This is possible because the activated sludge is alternately subjected to anoxic or aerobic conditions by changing the conditions in the respective cell series. The alternating conditions thus are the biological equivalent of a return cycle to the counter conditions of an earlier treatment phase.

In a variation of Tholander, U.S. Pat. No. 5,137,636 (Bundgaard) combines the alternating two-tank anoxic/aerobic treatment strategy with a second aerobic treatment cell followed by a clarifier. Clarified sludge is returned to the inlet manifold. Various other nitrogen and phosphorous removal schemes are described in books "Phosphorus and Nitrogen Removal from Municipal Wastewater, Principles and Practice" Second Edition, Richard Sedlak, Editor, Lewis Publishers, 1991, "Biological and Chemical Systems for Nutrient Removal" A Special Publication, Prepared by the Task Force on Biological and Chemical Systems for Nutrient Removal, Movva Reddy, Chair, Water Environment Federation, 1998, and in patents, for example, U.S. Pat. Nos. 2,788,127, 2,875,151, 3,236,766, 3,964,998, 4,056,465, 4,162,153, 4,183,807, 4,183,808, 4,183,809, 4,183,810, 4,271,026, 4,488,967, 4,500,427, 4,500,429, 4,874,519, 4,867,883, 4,874,519, 4,917,805, 4,948,510, 4,999,111, 5,013,441, 5,022,993, 5,076,928, 5,076,929, 5,098,572, 5,160,043, 5,182,021, 5,213,681, 5,288,405, 5,480,548, 5,601,719, and 5,651,891.

U.S. Pat. No. 5,441,634 awarded to Haskell Edwards reveals an apparatus and method for treating wastewater and solids and Biological Nutrient Removal in a single vessel and also provides clarification of the treated water within the single vessel. The vessel contains an airlift located in the upper portion and center of the vessel. Air is introduced at the bottom of the inverted cone shaped airlift ending with a narrow neck, transferring dissolved oxygen to the liquid and providing circulation of liquid between the airlift and the outer aerated zone. Water entering the bottom of the airlift flows out of the top of the airlift and creates an adjacent aerated zone. The adjacent aerated reactor is a vertical zone created by a baffle parallel to the airlift and clarification zone within the vessel. Immediately below the airlift and aerobic reactor is an anoxic zone. A sludge zone exists below the anoxic zone. This prior design is capable of lowering BOD levels and biologically removing a portion of nitrogen and phosphorus. However, the method of U.S. Pat. No. 5,441,634 uses an airlift for transferring dissolved oxygen and movement of MLSS (Mixed liquor and Suspended Solids) into an aeration zone and then still another adjacent aerated zone that does not provide denitrification. Also by having the anoxic zone as a lower extension of the aeration zone in the prior art Edwards apparatus, there is no continuous controlled and interactive processing between the aeration zone and the anoxic zone whereby the aeration zone breaks down long-carbon chain material and digests fatty acids, in the process producing undesirable nitrates, which can only be removed effectively in a well defined anoxic zone that requires more retention time for denitrification than the aeration zone requires for aerobic treatment. By having the lower anoxic zone and upper aeration zone vertically contiguous, it is not possible to individually control the important treatment (retention) times of the mixed liquor in the vertically juxtaposed lower anoxic zone and its contiguous upper aeration zone, since narrowing or widening of the aeration zone affects the flow in both zones that are virtually in series. Additionally, the prior art apparatus attempts to produce an anoxic environment under the aeration zone by drawing liquid through the vessel's lowermost sludge zone and mixing that polluted liquid from the sludge zone with the influent and then delivering that mixture into the treatment vessel (FIG. 2 in U.S. Pat. No. 5,441,634). Such mixing of liquid drawn through the sludge zone for the purpose of promoting an anoxic zone adversely affects the characteristics of the influent before even treatment begins. That mixing also affects all the upper zones of the Edwards prior art apparatus through further intermingling of a portion of the influent that emanates from the sludge zone with the aerated mixed liquor. Further undesirable intermingling of a portion of the polluted influent occurs with the mixed liquor in the adjacent aerated containment vessel and consequently intermingling occurs with the liquid that enters the annular junction of the clarifier. Such mixing is not conducive to achieving controlled treatment environments through well-defined treatment environments that are necessary for the required biological processes. Furthermore the prior art Edwards apparatus lacks controlled retention time related interaction between the aerobic and anoxic zones required for the removal of nitrates and the aerobic, anaerobic and anoxic interactions necessary for phosphorus removal.

Thus, despite the foregoing advancements in the prior art, there nonetheless exists a broad and long felt need for a process that more effectively treats wastewater and removes undesirable nitrogen and phosphorous nutrients from wastewater. There also is the need for performing such an effective process in a system that is more compact, self-contained, easy to maintain, easy to operate, widely applicable, less cumbersome mechanically and more cost-effective than traditional processes and systems. The instant invention satisfies those long felt needs and otherwise provides solutions to various problems recognized by the prior art.

SUMMARY OF THE INVENTION

Thus, it is an object of the instant invention to provide a new and advantageous wastewater treatment system and process that has aerobic, anoxic, facultative, anaerobic, clarification and sludge zones in a single vessel. It is another object of the instant invention to configure the aerobic, anoxic, facultative, anaerobic, clarification and sludge zones of a single vessel wastewater treatment vessel in a new configuration that achieves a more beneficial interaction between those zones to achieve an overall better processing of the wastewater, including removal of undesirable nitrates and phosphorus.

It is yet another object of the invention to control the respective retention (treatment times) in the aerobic and anoxic treatment environments so as to optimize the turn-over of the mixed liquor required for proper aerobic and anoxic processing. The instant invention renders those objects and other advantages over the prior art by providing a process that includes: maintaining horizontally adjacent aerobic, anoxic and clarification processing zones, with the aerobic processing zone being the innermost zone of the three concentric annularly disposed zones, the anoxic processing zone being the middle zone and the clarification processing zone being the outermost zone; feeding air into the bottom of the aerobic processing zone and causing an upflow; causing the upflow from the aerobic processing zone to pass into the downflow of the anoxic processing zone; causing at least a portion of the downflow from the anoxic processing zone to pass into the upflow of the aerobic zone; causing at least a portion of the downflow flow from the anoxic processing zone to pass into the upflow of the clarification processing zone; the process further including a vertical processing configuration with the highest processing zone being the aerobic processing zone, under which is a facultative processing zone followed lower by an anaerobic processing zone and finally a sludge zone at the bottom; causing solids to settle from the higher aerobic treatment zone by gravity, by the downflow of the anoxic processing zone and by the upflow of the clarified liquid zone to settle those solids into the anaerobic zone; withdrawing substantially clarified liquid from the uppermost portion of the upflow of the clarified liquid zone; and, finally, withdrawing a substantially solids material from about the bottom of the sludge zone. The invention also provides a system and method for practicing the process. The system includes a bioreactor vessel containing the aforementioned processing zones in a single, vertical and preferably cylindrical treatment vessel.

BRIEF DESCRIPTION OF THE DRAWINGS

The above and other features and advantages of the present invention will become apparent upon reading the following detailed description taken in conjunction with the accompanying drawings in which.

DETAILED DESCRIPTION OF THE PREFERRED EMBODIMENTS

Figure 1:
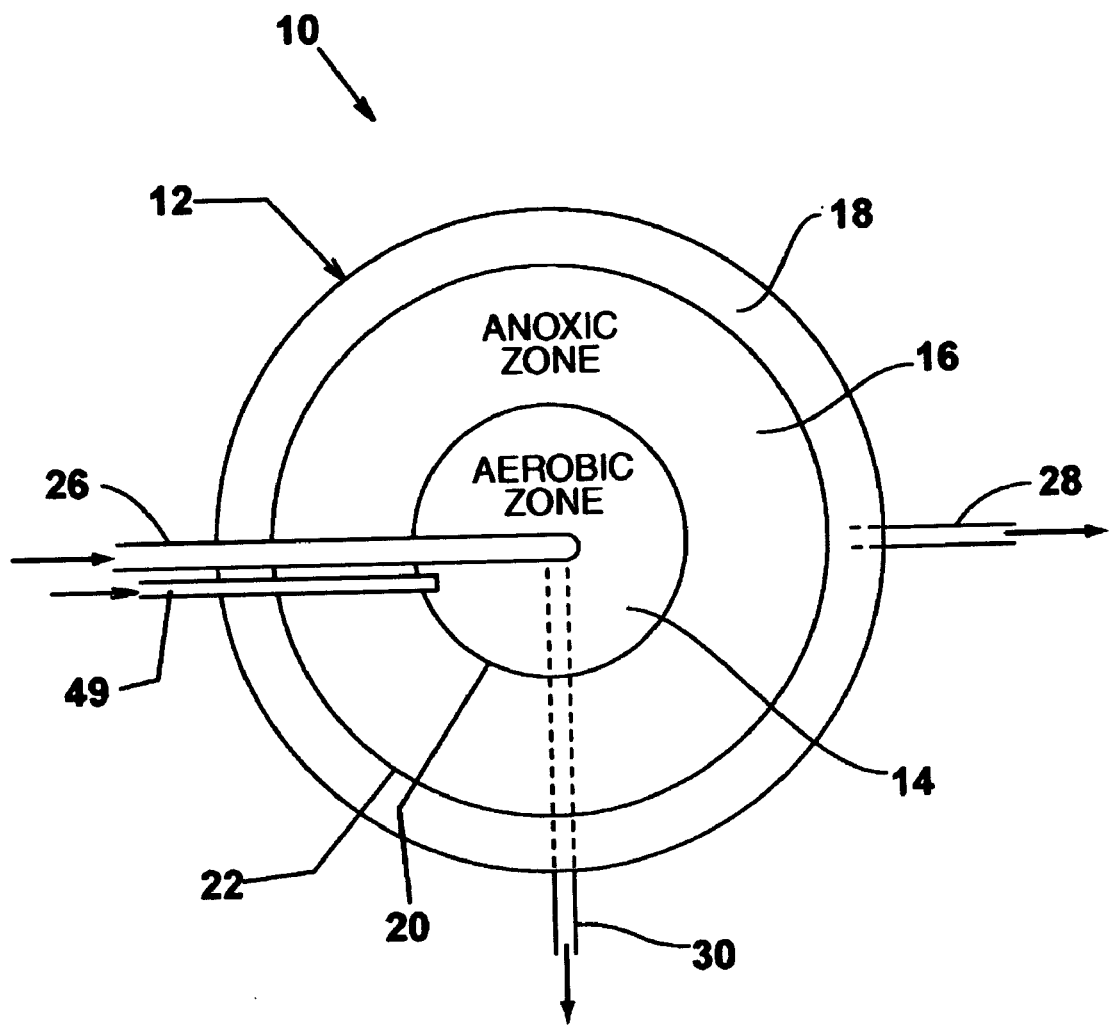
FIG. 1 shows a top schematic view of the system in accordance with a preferred embodiment of the present invention.
Figure 2:
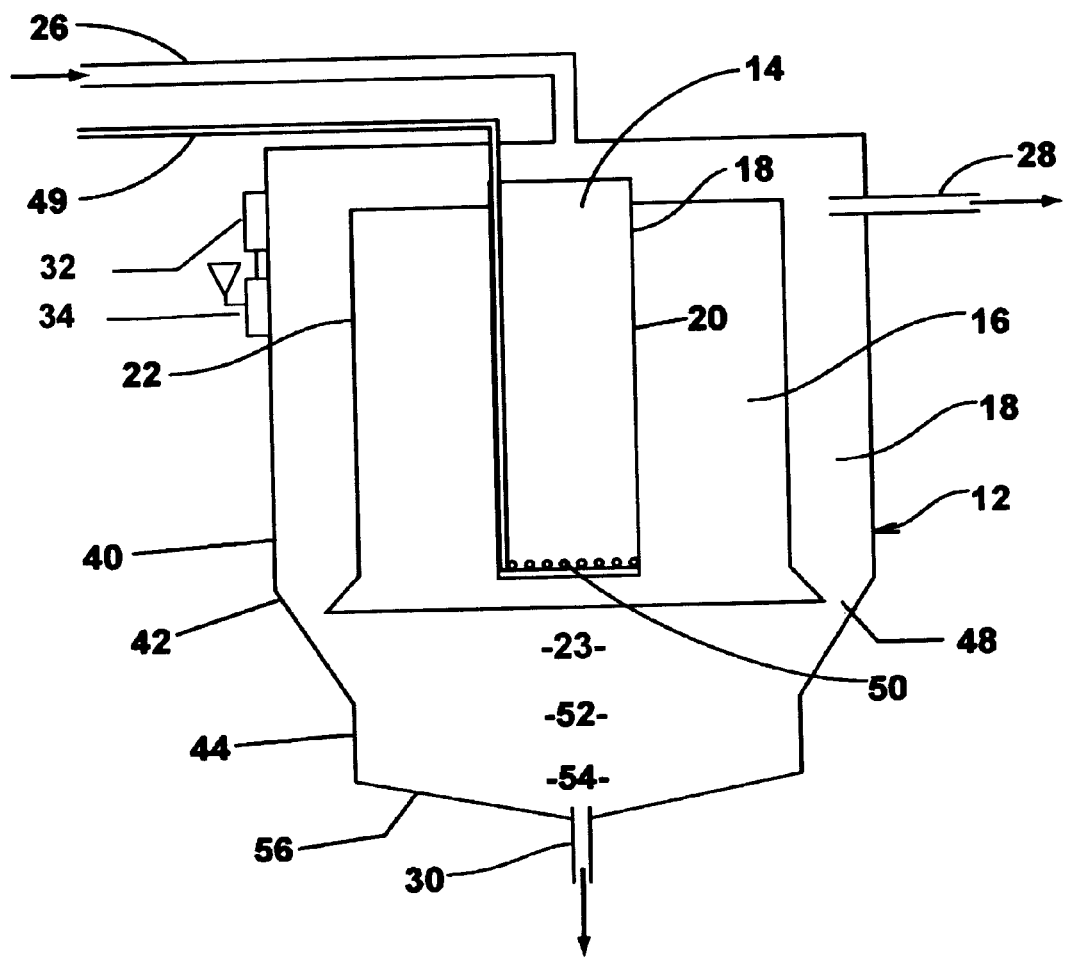
FIG. 2 is a sectioned side schematic view of the system of FIG. 1.

Referring to FIGS. 1 and 2, a single vessel multi-zone wastewater bio-treatment system 10 includes a vessel 12 having three concentric (annularly disposed) treatment zones 14, 16, and 18 located in the upper portion of the system. The innermost or center zone 14 is the aerobic zone. Horizontally adjacent to aerobic zone 14 in the middle annulus is the anoxic zone 16. Horizontally adjacent to anoxic zone 16 in the outer annulus is the clarification zone 18. The aerobic zone 14 and anoxic zone 16 zone boundaries are formed by baffles 20, 22 extending vertically down from the upper end of the vessel 12 into the facultative zone 23. The vessel 12 is also referred to herein as the bioreactor or bioreactor vessel.

An influent line 26 feeds influent to aerobic zone 14 from a source, not shown. An effluent line 28 discharges the treated water from the clarification zone 18 to a receiving site, not shown. A sludge conduit 30 is located at the bottom of vessel 12 and discharges the sludge produced in the process of treatment to a disposal site, not shown.

The system 10, as described in detail below, may be operated remotely by control system 32 coupled to a telemetry system 34 and connected to the various control components attendant to operating the treatment processes.

The vessel 12 comprises a cylindrical upper section 40, an inwardly and downwardly tapered frustoconical middle section 42 and a cylindrical lower section 44. The inner baffle 20 forms the outer boundaries of aerobic zone 14. The lower end of baffle 22 has a frustoconical section 43 having an outwardly and downwardly sloping wall towards the outer wall of the middle section 42 establishing therebetween and annular inlet port 48 to the clarification zone 18. The outer baffle 22 and the outer wall of bioreactor vessel 10 form the clarification zone 18. Means of controlling the flow into clarification zone 18 (not shown) may be disposed at or about port 48. The sloping walls assist in sliding solids into lower zones and similarly slide off any solids that gain entry into the clarification zone 18 through the inlet port 48. An air conduit 49 feeds an air diffuser array 50 located at the bottom of aerobic zone 14 creating an aerobic environment thereabove.

The area below air diffuser array 50 is the facultative zone 23, which is a transition zone between the upper and lower treatment zones of vessel 12. The facultative zone 23 is created by the mixing of flows from the upper and lower environments of vessel 10. Thus, facultative zone 23 is an environment for facultative organisms that can digest hydrocarbons in both the presence and absence of oxygen (facultative bacteria can live under aerobic or anaerobic conditions).

Under facultative zone 23, the level of oxygen drops to anaerobic level conditions, forming anaerobic zone 52 that is the above sludge zone 54 at the base of the lower section 44. The demarcations between the lower treatment zones are not as well defined as the upper treatment zones, due to the inherent nature of the processing in the lower zones. As an example, depending on the amount of sludge produced (which depends on the characteristics of the wastewater at any given time), the sludge 'blanket' (details of sludge not shown) level at the bottom of vessel 10 can rise or fall, affecting the 'boundaries' of the anaerobic zone 52 right above it. The sludge conduit 30 at the bottom of vessel 12 discharges the sludge produced from the treatment process.

The walls of middle section 42 of the vessel 12 below the upper treatment zones 14, 16, and 18 are sloped down towards the center of vessel 12 to promote the sliding down of remaining heavier particles from clarification zone 18 into the lower anaerobic zone 52. The base 56 of the lower section 44 is also sloped down towards the center of vessel to help with the settling of the sludge.

The interaction of aerobic zone 14 and anaerobic zone 52 was discussed earlier with respect to the removal of nitrates, which are produced by aerobic zone It will be appreciated that the processes and the system of the invention employ an anoxic zone 16 that is adjacent to an aerobic zone 14, whereas the prior art Edwards apparatus of U.S. Pat. No. 5,441,634 only has an aerated zone adjacent to its central aerating inverted funnel. The configuration of the system of the invention allows aerobic zone 14 and anoxic zone 16 to be independently sized for controlling the desired retention (treatment) time in each of those zones inasmuch as they perform different tasks.

The aerobic zone 14 of the system of the invention performs the breaking down of long carbon chains and digesting (oxidizing) fatty acids produced through interaction with lower anaerobic zone 52, which digests the heavier solids settling down by the gravity. The digestion of the heavier solids in anaerobic zone 52 produces volatile fatty acids that disperse into aerobic zone 14. The upflow of the volatile fatty acids into aerobic zone 14 is also assisted by the upflow current induced by the airflow introduced by air diffuser array 50 as indicated by the arrows in FIG. 3. The aerobic processes performed by aerobic zone 14 produce undesirable nitrates, which are removed through close and continuous interaction between aerobic zone 14 and its adjacent anoxic zone 16.

For a better understanding of how aerobic zone 14 and anoxic zone 16 are sized to achieve desirable treatment times of the mixed liquor in each of those zones, the following illustrative data relates to the design of a full-scale plant for treating wastewater from a slaughterhouse. For treatment through these zones, it has been experimentally discovered that a desirable retention time for treatment in aerobic zone 14 is around ⅓ of the time and the desirable retention time for treatment in anoxic zone 16 is around ⅔ of the time. As an illustration, engineering considerations for a single vessel multi-zone wastewater treatment plant using the processes of the system of the invention can include the following:

Flow: 650 m$^3$/day.
BOD (Biochemical Oxygen Demand): 1000 mg/l
Reactor organic loading rate: 650 kg/day
Reactor design criteria: 2 kg/m$^3$
Reactor volume: 325 m$^3$
Aerobic reactor zone ⅓ (10 minutes): 108 m$^3$
Anoxic reactor zone ⅔ (20 minutes): 217 m$^3$
Resultant reactor diameter and height respectively:
Aerobic portion 5.14 m by 5.2 m (app. 17 ft. by 17 ft.)
Anoxic portion 8.92 m by 5.2 m (app. 30 ft. by 17 ft.)

Figure 3:
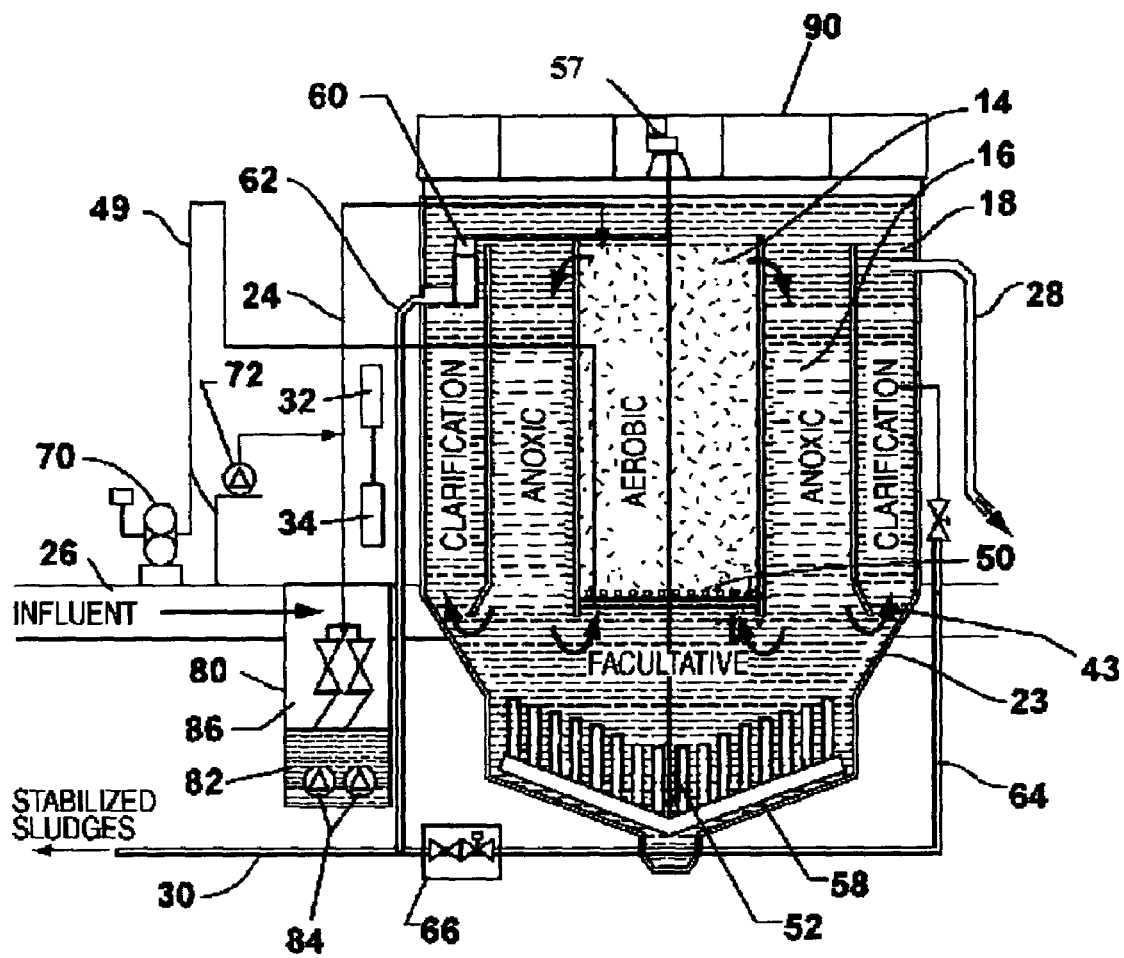
FIG. 3 is a vertical sectioned, side view of the system of the present invention, together with its processing zones, auxiliary equipment and support ancillaries.

Referring to FIG. 3, there is shown a preferred embodiment of the system and process of the instant invention, together with auxiliary equipment and support ancillaries. For clarity, repetitions of descriptions previously covered are minimized. Therein, the bioreactor vessel 12 includes aerobic zone 14, anoxic zone 16 and clarification zone 18 that are annularly disposed within the upper portion of vessel 12. The vessel 12 has the upright cylindrical upper section 40, the inwardly tapering frustoconical middle section 42 and the conical bottom or lower section 44. The wastewater influent line 26 feeds wastewater to aerobic zone 14 at the top of vessel 12. Alternately, the wastewater can be fed at the lower portion of aerobic zone 14. Air conduit 49 provides air to the bottom of aerobic zone 14 through the air diffuser array 50.

In a filled vessel per FIG. 3, when air is introduced at the bottom of aerobic zone 14 through air diffuser array 50, an upflow in the direction of the arrows is produced of the mixed liquor (the fluid with a culture of microorganisms—a mixture of liquid and lighter biosolids that have not settled into the lower zones of vessel 12) in aerobic zone 14. As the mixed liquor from aerobic zone 14 overflows into its adjacent anoxic zone 14, a downward flow is produced into anoxic zone 16 as indicated by the flow direction arrows. As the downflow from anoxic zone 16 reaches the bottom of the inner baffle 20, some of the flow leaving anoxic zone 16 is induced to flow back into aerobic zone 14 from the upflow current caused by the upflow of air from air array diffuser 50 reversely into aerobic zone 12 as indicated by the inwardly directed arrows. Another portion of the flow leaving anoxic zone 16 goes into clarification zone 18 through its narrow entry port 48 between outer baffle 22 and middle section 42 as indicated by the outwardly curved arrows. The sloping walls cause solids entering clarification zone 18 to slide out of that zone. It was discovered that throttling port 48, slows the upflow into clarifier 18, increasing the filtration action of the liquid flowing into the clarifier 18 though facultative zone 23. The filtering affect is produced from the consistency of the contents of facultative zone 23, which act similar to sand in nature filtering water flowing through it. The solids from the upper treatment zones are caused to settle into the anaerobic zone 52 by gravity and by the flow out of anoxic zone 16, passing through the transition facultative zone 23 where facultative organisms remove some hydrocarbons. The solids reaching the anaerobic zone 52 are absorbed by anaerobic bacteria and synthesize volatile fatty acids, portions of which disperse into aerobic zone 14 where oxidation occurs producing nitrates. The anoxic zone 16 performs continuous denitrification (removal of nitrates) and interacts with aerobic zone 14 though the flows described above. Another interaction between aerobic zone 14 and the anaerobic zone at the bottom portion of vessel 12 performs the complex task of phosphorus removal. The process of biological removal of phosphorus was discussed earlier and is here discussed specifically in relation to the system and process of the invention. Removal of phosphorus from municipal and industrial wastewater treatment plants is critical in preventing eutrophication (increased growth of non-beneficial plants and animals due to phosphorus) of surface waters. Exposing the mixed liquor to the anaerobic/aerobic sequence and interaction (including some anoxic interaction) that occurs in the vessel 12 selects microorganisms that accumulate higher levels of intracellular phosphorus than other microorganisms. As discussed above, the anaerobic fermenter organisms of the anaerobic zone 52 absorb and synthesize volatile fatty acids. Phosphorus-removing microorganisms are able to rapidly assimilate and store those volatile fatty acids (VFAs) and other fermentation products under the anaerobic conditions in the anaerobic zone 52 of the bioreactor vessel 12. Phosphorus is released in anaerobic zone 52 to produce the energy needed to take up the fermentation products, which are stored as poly-β-hydroxybutyrate. The stored fermentation products are utilized by phosphorus-removing microorganisms to produce energy by oxidizing the stored fermentation products in the aerobic zone while simultaneously accumulating intracellular phosphate.

In summary, the ability of phosphorus-removing microorganisms to rapidly assimilate the fermentation products under anaerobic conditions of the anaerobic zone of vessel 12 gives them a competitive advantage over other microorganisms and results in their preferential growth in the wastewater treatment system of the invention. Thus, the configuration and the processes of the system of the invention produce a selection of a large population of phosphorus-removing microorganisms and an efficient aerobic/anaerobic (and some anoxic) interaction for removal of undesirable phosphorus.

From the above discussed nitrate and phosphorus removal provisions, configuration and interactions that characterize the system and process of the invention, it can be comparatively determined that it is a substantial advancement over prior art discussed, especially the Edwards U.S. Pat. No. 5,441,634, which essentially is a BOD reduction system, with no specific provisions for the removal of undesirable and harmful nitrates and phosphorus, whereas the system and process of the invention performs better overall treatment that also includes removal of undesirable and harmful nitrates and phosphorus.

A sludge rake 58 adjacent the base 56 is driven through its shaft by sludge rake motor 57 shown at the top of vessel 12. Also connected to the shaft of sludge rake motor 57 is a scum rake 60 that removes debris, such as leaves, from the top of vessel 10. The debris removed by the scum rake 60 is discarded through scum removing conduit 62, which connects to the sludge discharge conduit 30. A line 64 provides a fluid utility connection from clarification zone 16 into the sludge discharge conduit 30. It can be used to partially empty the top portion of clarification zone 18 during maintenance and to provide clean water to clear or water-down sludge buildup that may occur at an automatic sludge valve 66 in the conduit 30. Sludge valves are available from a variety of sources, such as Red Valve Company of Pittsburgh, Pa. Accordingly, substantially only wet solids are withdrawn through sludge discharge conduit 30.

An oxygenation blower 70 delivers air to the air diffuser array 50 through air conduit 49. An optional dosing pump 72 adds beneficial biological nutrients to influent line 26. Beneficial biological nutrients (also referred to as accelerants) can be used with the system of the invention to enhance the diversity and activity of desirable microorganisms in bioreactor vessel 12 and are available from a variety of sources, such as Pegasus Solutions, 486 Bankhead Hwy Carrollton in Georgia. The beneficial biological nutrients can be of a general type or specifically designed for specific wastewater applications, where it would be advantageous to add a custom beneficial nutrient to the influent to enhance a desired diversity of microorganisms. Manufacturers provide application rate recommendations. Dosing pumps are available from a variety of sources, such as Hanna Instruments, Inc. in Woonsocket, R.I.

A lifting station 80 is used to draw influent from a wastewater sump 82 and deliver it to the system of the invention through influent line 26. Two pumps 84 are depicted as is common practice for ensuring the availability of a standby pump in case of problems with the main pump. The pumps normally connect to a common manifold through check valves 86 that prevent the flow of one pump from going into the other pump. The manifold connects to influent line 26. The sump normally receives the wastewater to be treated from a stabilization basin (not shown) that acts as a buffer when the source of influent is intermittent as in a day operation and night stoppage of a process. The pumps used depend on the flow rate desired and the head pressure to be encountered, as anyone skilled in the art can determine. Where the influent source is steady, the system of the invention allows direct pumping of the influent into the vessel 12. The pumps can be acquired from a wide variety of sources, such as from HOMA Pump Technology, in Ansonia, Conn.

The motors of the pumps of lifting station 80, the oxygenation blower 70, the optional beneficial nutrient dosing pump 72 and sludge/scum rake 58 are controlled and powered by conventional methods, such as contactors with on/off and interlocked controls, as any one skilled in the art can choose to implement. A catwalk 90 facilitates performing desired measurements and routine inspections of bioreactor vessel 12.

Figure 4:
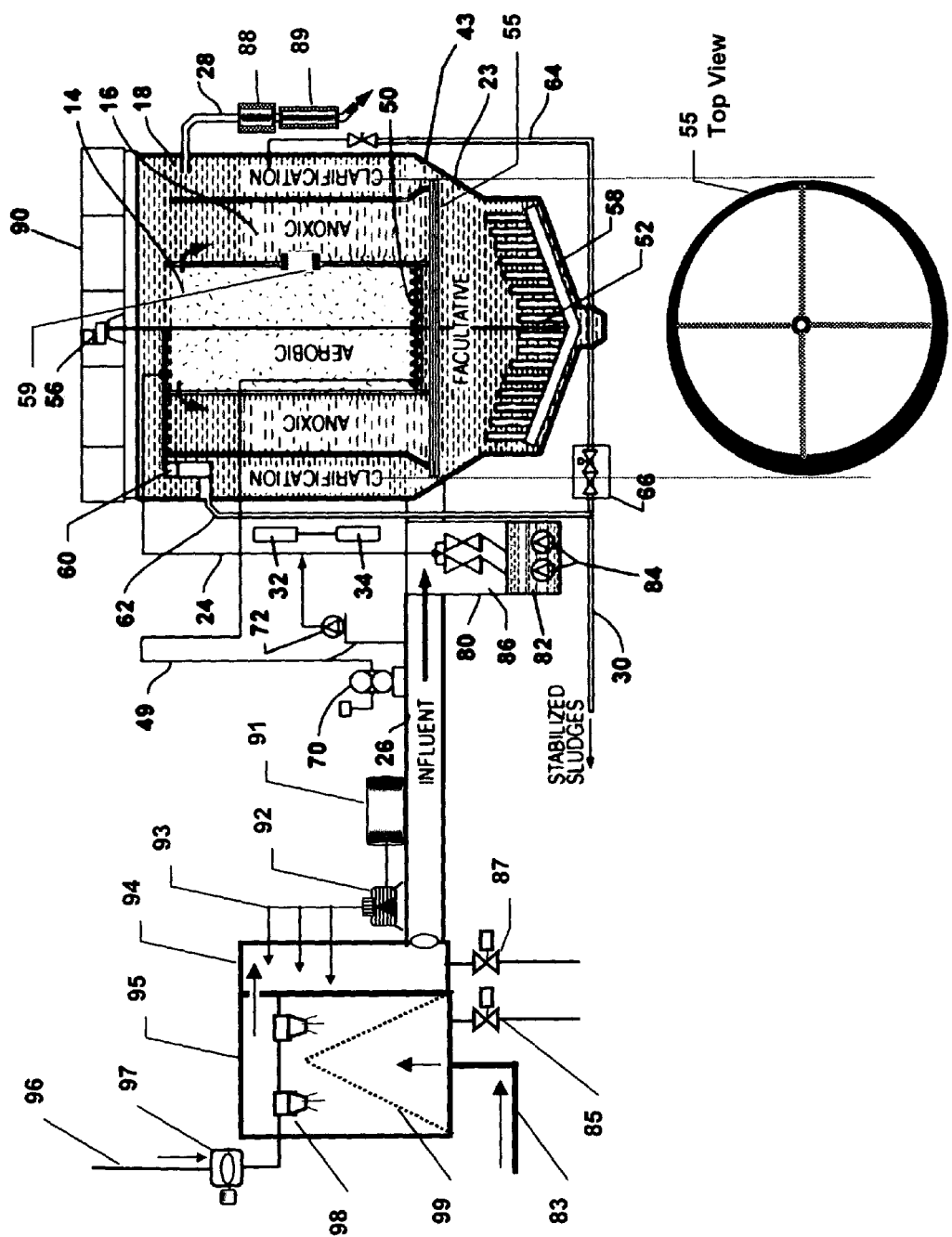
FIG. 4 show another shows another embodiment of the invention.

Another illustrative control approach for the process and system of the invention would include an off-the-shelf programmable logic controller (PLC) at the heart of the control system 32. Control system 32 includes inputs, outputs, software for instructions and networking capability. Inputs to the control system 32 would include inputs from dissolved oxygen sensors located at different points and levels in the aerobic, anoxic, facultative-transition and anaerobic zones. Additionally, inputs to control system 32 can also include the speed of the oxygenation blower 70, sludge density, sludge level, float switch positions, the level of the optional beneficial biological nutrient, flow rate indications in the various zones and other sensed conditions that reflect on the operation of the process and system performance and which can be used for affecting adjustments, related outputs, related reporting, diagnostics and alarm outputs as well. Controller 32 provides outputs based on its software instruction acting in conjunction with sensed input conditions as discussed above. As an example, control outputs to pumps 84 will be based on the input into control system 32 from a float switch (not shown) which would reflect the level of influent in the aerobic zone. Control outputs to control the speed of oxygenation blower 70 would be correlated by control system 32 to the sensed demand for Oxygen in the aerobic zone. Programmed timed control outputs from control system 32 to the optional dosing pump will regulate the intervals of dosing pump 72. Control system 32 can also regulate the rate of flow from aerobic zone 14 into anoxic zone 16 by means of one or more adjustable ports between the zones (port 59 as shown in FIG. 4) based on sensed oxygen levels in the anoxic zone. Other control outputs for control system 32, such as alarm indications and reporting on the control positions or status of the various controlled elements can be programmed. The software for the PLC in control system 32 can be written in any language convenient, such as C++ language and compiled into Assembler or Machine Language. Control system 32 would be further interfaced with the power control systems that can be solid state or electromechanical, as well known to those skilled in the art of making electrical control panels. Most modern programmable logic controllers also allow networking with local computers, supervisory terminals and local area networks for communication with system elements and remote supervisory equipment, such as remote supervisory computers.

An example of a commercially available PLC that can be used as the heart of control system 32 is the GPC553 general-purpose industrial programmable logic controller made by MicroSHADOW Research, Via Garibaldi, 19020 Ceparana (SP), Italy. The GPC553 PLC uses embedded firmware programming in C, C++, Assembler and other programming languages using DOS or Windows. It interfaces to computers via its RS232 interface. The illustrative GPC553 PLC unit utilizes a Philips80C552 microcontroller. It has 8 outputs for solid state or relay operation, 8 analog/digital channels and 15 optically isolated inputs.

The instant system of the invention is integrated in a single vessel and thus can be enhanced economically and advantageously through the incorporation of a telemetry and remote control system 34, working in conjunction with the control system 32 to allow remote monitoring and control of the system of the invention. The remote control system 34 can operate over a local area network, over the Internet or wireless networks. The local area networks and Internet-based networks are widely used and well know to those skilled in the art. For wireless operation, illustratively, the telemetry and remote control system 34 can include a communication portion, a decoder, a microprocessor, a logic line interface, inputs outputs and software. The decoder can be discrete or embedded in the microprocessor. The telemetry and remote control system 34 can operate over cellular networks that are designed for narrow band or wide band PCS operation, using well known TDMA (Time Division Multiple Access), CDMA (Code Division Multiple Access) and FDM (Frequency Division Multiplex) protocols as convenient. The remote control system 34 can also utilize satellite bands and their common protocols where remote monitoring and control is desired over large distances. Alternately, less commonly known but preferable for nationwide coverage, would be the use of two-way paging networks, such as ReFlex two-way paging networks.

An illustrative example of a communication approach for monitoring and remote control that can readily used with the system of the invention because of its single vessel integrated design is Motorola's CreataLink2XT unit that operates over two-way ReFlex networks in the 800–900 MHz UHF (Ultra High Frequency) Band. It is equipped with serial and parallel interface ports, 8 custom configurable inputs/outputs, 6 collector outputs and operable on 5 to 12 Volts DC (Direct Current). The software for such remote control would be written so that each command from a remote control location includes a destination identification (ID) of the treatment plant of the invention to be accessed, a source ID, a security code corresponding to the security code embedded in the remote receiving unit at the plant and instructions that will be received by remote control system 34 and communicated via a communication port to the PLC in control system 32.

For monitoring the remote integrated wastewater treatment system of invention, the control system 32 can be polled remotely or by the program instructions to provide remote monitoring of the status of the system and its sub-elements, to provide confirmation of remote commands, to provide diagnostic data based on sensor inputs to the PLC of control system 32 and alarms when required. Transmissions from the remote control system 34 at the single vessel integrated treatment plant of the invention would include a plant ID, a security code and a message including reporting data, such as the status of the system and its sub-elements, confirmations of remote commands, diagnostic data based on inputs to the PLC of control system 32 and alarms when required.

The telemetry and remote control system 34 is made practical by the integrated design of the system of the invention and affords great advantages to the user, who can contract remote monitoring and adjustment tasks with the supplier of the plants based on the system of the invention and minimize the risks of problems caused by inexperienced operators and illegitimate users, while providing pre-emptive resolutions to anticipated or changing conditions in vessel 10 and changes in the parameters that affect the performance of the system.

The wireless embodiment of telemetry and remote control system 34 can operate in any desired portion of the frequency spectrum, including HF (High Frequency), VHF (Very High Frequency), UHF (Ultra High Frequency) and SHF (Super High Frequency—commonly referred to as microwave) Bands. Even portions of the radio and TV broadcasting spectrum can be utilized for facilitating the wireless operation of telemetry and remote control system 31.

From tests conducted, the process of the invention requires an environment of around 3 mg/liter of oxygen for ideal treatment in the aerobic zone 14. For proper treatment, anoxic zone 16 requires an environment with an oxygen level of around 0.05 to 0.2 mg/liter. The facultative zone 23 usually functions in the range of around 0.2 to 0.5 mg/liter of oxygen depending on the oxygen levels in the upper, more critical aerobic zone 14 and anoxic zone 16. These oxygen level in aerobic zone 14 can be adjusted by adjusting the rate of air delivery to the aerobic zone in response to sensed oxygen levels that are measured at around 6 ft (or 9 ft for larger vessels) from the top level of the contents in vessel 10. The air delivery can be varied by varying the speed of blower 70 according to sensed oxygen levels according to the programmed instructions of control system 32. The oxygen level in anoxic zone 16 is influenced by the flow rate of mixed liquor from aerobic zone 14 into anoxic zone 16 and is discussed under a description of FIG. 4.

Referring to FIG. 4, another embodiment of the invention is shown with several enhancements that can be readily integrated into the system of the invention and process discussed in previous figures to accommodate special applications and custom requirements. One such enhancement is the integration of port 59 into the baffle 20 separating the aerobic zone 14 and anoxic zone 16. It has been discovered that the incorporation of one or more ports, such as port 59 between aerobic zone 14 and anoxic zone 16 affects the oxygen levels in anoxic zone 16. The size of the port determines how much aerated mixed liquor flows into the anoxic zone and thus affects the oxygen levels in the anoxic zone. The smaller the opening of port 59, the lower the oxygen level will be in anoxic zone 16. Conversely, the larger the opening of port 59, the higher the oxygen level will be in anoxic zone 16. The opening of port 59 can be made adjustable to adapt automatically or manually to sensed oxygen levels in anoxic zone 16.

Another enhancement in the embodiment of FIG. 4 is the incorporation of a throttling system at the port 48 of the clarification zone 18. As mentioned earlier, it has been discovered that slowing the upflow into the clarification zone 18 at port 48, allows additional filtering of the potential effluent by the environment of facultative zone 23 in a manner similar to sand filtering water flowing though it. Thus, such controlled slowing of the upflow from facultative zone 23 can significantly improve the quality of the effluent in general use and during special conditions, such as storms that can dramatically affect a municipal influent. However, testing has indicated that continuous throttling of port 48 at any point eventually starts drawing in the filtering medium itself from facultative zone 23 and negatively affects the quality of the influent. The solution to deriving the benefits of this additional filtering and not its drawbacks (when overused) is in the form of wheel 55 that is mounted on the shaft of rake motor 56.

Wheel 55 is positioned directly under port 48. It is an open wheel with spokes that does not affect the interactions of the upper and lower treatment zones. The perimeter of wheel 55 is shaped similar to a cam with a perfect circle in its center. Just as with a cam, the outer edge of wheel 55 changes from a narrow strip to a wider strip as shown in the top view detail of wheel 55 in FIG. 4. As the rake shaft turns slowly, at any given point of the circular port 48, wheel 55 gradually throttles the port opening at that point and then gradually opens it up as the eccentrically edged wheel continues to turn. Thus, temporary and gradual slowing of flow into port 48 is realized at every point around the clarifier circumference, followed by gradual and smooth increased flow into port 48. Wheel 55 can be made of corrosion resistant metal or composites.

For illustration of the post-treatment interfacing capabilities of the system of the invention, the incorporation of a post-treatment disinfecting unit 89 is shown in FIG. 4. Disinfecting unit 89 is directly integrated with the system of the invention and can an ultraviolet disinfecting unit that is located on the effluent line 28, before the effluent is delivered for use. Such disinfection units are already in wide use in wastewater treatment systems, but the system of the invention makes them especially practical since they can be directly incorporated to derive a single vessel wastewater treatment system with integral means of disinfecting the effluent. The same applies to the incorporation of a post treatment filter 88, which can be any type of ultrafiltration unit that is available on the market.

Where certain stringent applications, such as hog wastewater treatment applications, require treatment of influents with very high levels of total suspended solids (TSS) that exceed 22,000 mg/liter, the system of the invention can be readily integrated with a screening and separation system. A preferred screening and separation system developed for direct integration with the system of the invention is shown in FIG. 4. It consists of a screening unit 95 and flocculating unit 94 that are integrated with vessel 10, or located adjacent to it, to intercept the influent with high TSS and deliver screened and flocculated influent into the influent line of vessel 10. Flocs were discussed earlier, including their benefits in wastewater treatment.

Referring to FIG. 4, raw influent with high TSS is pumped into screening unit 95 at the bottom of inverted cone 99. Cone 99 is perforated to screen out large particles. Although screening cone 99 is preferably in the shape of an inverted cone, other suitable shapes can be used based on the same concept. The screened influent from screening unit 95 then flows into flocculating unit 94, where dosing pump 92 injects a flocculating agent 93, such as polymeric aluminum, into the screened influent in flocculating unit 94. Dosing pump 91 is supplied by container 91. Flocculating agents and their dosing rates depend on the type of influent being encountered. The basic system of the invention as described in FIGS. 1, 2 and 3 has been tested for influents of 100 to 22,000 BOD-5 mg/liter with up to 20,000 of TSS. Flocculating agents can be formulated by the suppliers to target specific requirements and this is greatly facilitated in the case of the system of the invention due to its extensive treatment range inherent from the incorporation of six specially configured treatment zones and their interactions. One specialized supplier of flocculating agents and related dosing systems is CIBA Specialty Chemicals, located in Bradford, West Yorkshire, United Kingdom.

Since screening cone 99 can be eventually clogged by the high TSS raw influent that flows through it, a back-flush system with nozzles, such as nozzle 98 shown, is included to periodically flush back material that clogs the perforations of screening cone 99. A portion of the clean effluent is pumped through pipe 96 into injectors 98 and through flow control device 97 which can be a solenoid or butterfly valve. When flow control is activated per programmed timing of control system 32, nozzle 98 and other similar nozzles eject high pressure water jets into the screening cone 99 to clear any clogging. Control valves 85 and 87 are programmed to periodically discharge any accumulation respectively in screening unit 95 and flocculating unit 94 into the sludge line 30 or to return the accumulation to the raw influent source, depending on the nature of the raw influent in a particular application. The discharging from valves 85 and 87 can be carried out when the raw influent supply 83 is stopped automatically when vessel 10 is full or through periodic programmed stopping of the raw influent pumps for several minutes. The back-flush system is momentarily activated to facilitate the discharge. Although screening cone 99 is in the shape of an inverted cone, other shapes can be used based on the same concept.

The instant system of the invention is quite versatile and compatible with virtually all pretreatment systems and post treatment systems depending on the requirements of the application due to its single vessel integrated design. When total suspended solids of the influent line 26 are abnormally high, in addition to the above integral screening and flocculation approach, the process and system of the invention can be easily and economically used in conjunction with other screening and separation units, such as centrifugal and screw type separators that typically include a means of screening. When the integrated system of the invention has to cope with substantially varying influent volumes and influent characteristic changes that can also produce sludge rise and contamination of its treatment zones, a pretreatment vessel can be economically used with the invention's integrated design as a buffer and repository for the sludge, which can be facilitated with some aerobic treatment through the introduction of some air into the pretreatment vessel, just as in the process and system of the invention. Where influents are unstable and also there is an abnormally high level of total suspended solids, the above pretreatment vessel can economically and advantageously operate in conjunction with the above mentioned separators due to the single vessel and integrated design of the system of the invention.

Other pretreatment systems that can be readily incorporated into the process and system of the invention because of its unique design and treatment process, include ultrasonic units available from a variety of sources, such as Atkins (www.atkinsglobal.com). Ultrasound applications are well knows to those skilled in the art. Ultrasound normally refers to sound energy above the audible range. When such energy is applied to wastewater at sufficiently high intensities its can cause a phenomenon known as 'cavitation'. This cavitation effect can be used to derive a range of physical, chemical and biological reactions, including the breakup of carbon chains, break up of solids into smaller particles and destruction of various undesirable bacteria, depending on the frequency of the ultrasound energy and location of its source. In the single vessel system of the invention a suitable and convenient location for the breakup of long carbon chains and solids where the ultrasound transducers can be located is influent line 11, before it delivers the wastewater for further processing in its various treatment zones.

The description of the instant invention in FIGS. 1, 2, 3 and 4 provide a detailed explanation of the process, system and method of the invention. In addition, various modifications can be made to what is described under those figures without departing from the spirit of the process, system and method of the invention for treating wastewater. As an example, the bottom portion of vessel 10 can be extended in applications where sludge contamination from abnormally varying influent flows would be encountered. As another example, for a similar abnormal situation where some sludge rise would be encountered, an inverted cone baffle made of non-corrosive material and smaller than the diameter of the lower portion of the vessel can be placed above the sludge zone with an opening in the center. The sludge rising from the center opening and sides will encounter some retention and slide off the sloping walls of the inverted cone baffle rather than readily being captured by abnormal upflow currents during abnormal conditions.

Below are illustrative examples derived from tests with respect to the performance of the instant system and processes of the invention, compared to the performance of the prior art Edwards apparatus of U.S. Pat. No. 5,441,534.

ILLUSTRATIVE EXAMPLE 1

As an illustration of the process in an experimental slaughterhouse wastewater treatment system, the influent of the prior art experimental system around U.S. Pat. No. 5,441,634 includes: water, total suspended solids ranging from 500 to 900 mg/l, Bio-Chemical Oxygen Demand (BOD-5) ranging from 650 to 1000 mg/l, Total Nitrogen ranging from 150 to 200 mg/l and phosphorus ranging from 20 to 40 mg/l.

The effluent of the prior art process and system of U.S. Pat. No. 5,441,634 treating wastewater from the above illustrative slaughterhouse includes water, suspended solids, nitrogen, and phosphorus.

The influent of the instant invention for the above slaughterhouse includes the same characteristics as the influent of the prior art Edwards apparatus.

The effluent of the instant invention treating wastewater from the above slaughterhouse also includes water, suspended solids, nitrogen, and phosphorus.

Table 1 below illustrates the dramatically better processing achieved through application of the process and system of the invention versus the prior art process and apparatus of U.S. Pat. No. 5,441,634.

TABLE 1

1. Slaughterhouse Wastewater Treatment System

| EFFLUENT CHARACTERISTICS | BOD-5 | Total Suspended Solids | Total Nitrogen | Phosphorus |
| --- | --- | --- | --- | --- |
| Prior Art Edwards Process Average Values | 38 mg/l | 36 mg/l | 39 mg/l | 32 mg/l |
| Invention Process Average Values | 18 mg/l | 16 mg/l | 9 mg/l | 3 mg/l |

ILLUSTRATIVE EXAMPLE 2

The relevant influent compositions (liquid and solid) of the prior art pilot wastewater treatment system of U.S. Pat. No. 5,441,634 with a flow of 2870 liters per day, providing treatment for the discharge of a food processing facility producing French fries includes: water, total suspended solids averaging 3300 mg/l, Bio-Chemical Oxygen Demand BOD-5 averaging 2480 mg/l, Total Nitrogen averaging 140 mg/l and phosphorus averaging 44 mg/l.

The effluent of the prior art system treating wastewater from the above food processing facility includes water, suspended solids, Total Nitrogen and phosphorus.

For the illustrative experimental pilot food processing wastewater treatment system, the influent of the system of the invention includes the same contents and characteristics as the prior art Edwards system.

The effluent of the prior art system treating wastewater from the above food processing facility includes water, suspended solids Total Nitrogen and phosphorus.

TABLE 2

Food Processing Wastewater Treatment System

| EFFLUENT CHARACTERISTICS | BOD-5 | Total Suspended Solids | Total Nitrogen | Phosphorus |
| --- | --- | --- | --- | --- |
| Prior Art Edwards Process Average Values | 38 mg/l | 39 mg/l | 36 mg/l | 22 mg/l |
| Invention Process Average Values | 19 mg/l | 18 mg/l | 10 mg/l | 3 mg/l |

Table 2 above illustrates the significantly better performance of a food processing pilot experimental wastewater treatment plant that employs the process and system of the invention versus the prior art experimental process and system of U.S. Pat. No. 5,441,634.

The recirculation in the instant invention can be analyzed using the equations of Euler and Bernoulli for the separation of the flow between each zone at facultative zone 23. As discussed earlier, the flow that emanates from anoxic zone 16 is separated into two different flows. One flow returns to aerobic zone 14, and the other flow enters the clarification zone.

$QA$ (mass balance)=$Q$ clarifier+$Q$ aerobic

QA is the flow from anoxic zone 16.

Referring again to FIGS. 3 and 4, in the system of the instant invention, wastewater is added to the reactor 10 at a given flow rate from the top of aerobic zone 14 on a continuous basis. Since there is no accumulation of liquid inside reactor 10, an equal volume of liquid exits reactor 10 on a continuous basis. The liquid content of reactor 10 continuously circulates between aerobic zone 14 and anoxic zone 16. Tests indicate that desirable retention times of the circulating liquid in aerobic zone 14 and anoxic zone 16 is ideally 12 minutes in aerobic zone 14 and 18 minutes in anoxic zone 16. These values are preset during tests by adjusting the aperture of the inter-zone ports, such as port 59, between aerobic zone 14 and anoxic zone 16, as well as the input power of air compressor 70 that introduces air through air diffusers 50 into aerobic zone 14. The air diffuser array 50 is located at the bottom of aerobic zone 14. This implies that the length of a full cycle of liquid between the two zones of aerobic zone 14 and anoxic 16 is 30 minutes.

Assuming that the volume (Vr) of reactor 10 and the influent wastewater flow rate (Q) are constant, a constant percentage of the reactor 10's liquid content leaves the reactor during any given period. Therefore, the change in time of the mixed liquor volume (dYr/dt) is directly proportional to the volume of mixed liquor in the reactor. This relationship can be mathematically expressed as follows:

$$dY_r/dt = -kY_r \qquad 1)$$

or:

$$Y_r = Y_i e^{-kt} \qquad 2)$$

Where $Y_r$ is the volume of mixed liquor at time (t), $Y_i$ is the initial volume of mixed liquor that is equal to the overall reactor's volume ($V_r$), and k is a constant representing the specific rate of liquid volume discharged from the reactor. This constant defines the fraction of liquid discharged from reactor 10 per hour. The fraction of mixed liquor volume in reactor 10 at any given time (t) can be expressed by the following equation:

$$\% \ Y_r = Y_r * 100/Y_i = e^{-kt} * 100 \qquad 3)$$

Similarly, the volume of wastewater inside reactor 10 at any given time may be expressed as follows:

$$Y_w = Y_i(1-e^{-kt}) \qquad 4)$$

Where $Y_w$ is the volume of influent wastewater inside the reactor.

The fraction of wastewater liquid based on the total content of reactor 10 is:

$$\% \ Y_w = Y_w * 100/Y_i = (1-e^{-kt}) * 100 \qquad 5)$$

The following conclusions can be made from equations 1 to 5:

When $t=0 \Rightarrow Y_r=Y_i$ The initial volume of mixed liquor is equal to the reactor's overall volume.

When $t=0 \Rightarrow Y_w=0$ There is no wastewater inside the reactor at time zero and the initial mixed liquor is the only liquid that occupies the reactor.

Similar equations can be used to determine the time-dependent changes in the volume of a discrete volume of wastewater added to reactor 10. It assumes that a fraction of wastewater is continuously leaving reactor 10 as the process is in a continuous mode of operation and there is no liquid accumulation inside reactor 10. The time-dependent change in the volume of this wastewater (Yw) inside reactor 10 is expressed by the following equation:

$$Y_w = Y_{wi} e^{-kt} \qquad 6)$$

Where Ywi is the volume of wastewater liquid added to reactor 10 at time zero.

The percentage of wastewater that has left reactor 10 at any given time (t) is found as follows:

% wastewater liquid volume that has left the reactor=
$$(Ywi-Yw)/Ywi \qquad 7)$$

Using Equation 6, the following relationship will result:

% wastewater liquid volume that has left reactor 10 at
$$\text{time } (t)=1-e^{-kt} \qquad 8)$$

The average number of cycles for a given quantity of wastewater entering reactor 10 is estimated from the following relationship:

$$Y_w = Y_{wi} e^{-kt} \qquad 9)$$

$$t = -1/k \ \ln(Y_w/Y_{wi}) \qquad 10)$$

$$\text{Average} = -1/k \int \ln(Y_w) dY_w = -1/k[Y_w \ln(Y_w) - Yw]_{(0-1)} \qquad 11)$$

$$\text{Average} = -1/k[-1-0] = 1/k \qquad 12)$$

Therefore, the average number of cycles between aerobic zone 14 and anoxic zone 16 for a given quantity of wastewater is equal to 1/k.

The system and process of the invention produce a low amount of biological sludge that is considerably lower than that found in traditional biological treatment systems, such as activated sludge systems. This phenomenon has been observed under different testing conditions, even when the invention's operating conditions are less than favorable, constituting one of the most important attributes of the technology of the invention. The high solids retention time (SRT) of frequently greater than 50 days and the use of an optional beneficial nutritional supplement contribute to the digestion of accumulated sludge in the anaerobic zone and lower the volume of discharge (waste) sludge. However, the main reason behind the generation of low amounts of sludge in the system of the invention is related to its production of considerably less microbial biomass compared to other aerobic, suspended-growth biological treatment systems. The low production of microbial cells that constitute 60%–70% of biological sludge, translates into the generation of considerably lower amounts of sludge by the system of the invention.

The process of the invention employs a high cell concentration biological treatment system. Due to its special design, it has been observed during testing that the major fraction of influent BOD is converted to microbial biomass during the initial stabilization period. During this period, the produced biomass continues to accumulate in the mixed liquor, reaching concentrations of 5–10 times greater than that of the influent BOD while circulating between aerobic zone 14 and anoxic zone 16. After the stabilization period, it has been observed that the influent BOD can no longer support unrestricted microbial growth due to the very high biomass concentration and only supports cell maintenance and minimal cell growth The accumulated microbial biomass continuously degrades the carbonaceous material in the influent wastewater, transforming it into by-products, notably $CO_2$ and water. The other components of wastewater are also metabolized by the active heterotrophic and autotrophic cells in the mixed liquor.

The performance of the system of the invention can be further understood from the results of early tests in 1999 over approximately 2 months. The tests required treating wastewater discharge from a hog slaughterhouse. The flow for the test was 5.5 cu. Meters per day (around 1452 gallons per day):

Influent Wastewater Characteristics
Parameters measured in mg/l

|  | TSS | COD | Soluble COD | BOD$_5$ | Soluble BOD$_5$ | Ammonia-N | TKN | Total P |
|---|---|---|---|---|---|---|---|---|
| Aug 19 | 780 | 2600 | 1200 | 1600 | 910 | 150 | 230 | 25 |
| Aug 24 | 1100 | 2800 | 1100 | 2200 | 750 | 120 | 180 | 18 |
| Sep 2 | 1300 | 3300 | 1100 | 1600 | 550 | 110 | 190 | 24 |
| Sep 8 | 810 | 2300 | 900 | 1400 | 480 | 55 | 200 | 20 |
| Sep 17 | 790 | 2800 | 1300 | 2100 | 1100 | 72 | 220 | 29 |
| Sep 21 | 710 | 1800 | 1100 | 1500 | 700 | 59 | 200 | 21 |
| Sep 23 | 860 | 3000 | 1100 | 2300 | 540 | 64 | 230 | 28 |
| Sep 29 | 600 | 2000 | 780 | 1500 | 500 | 82 | 190 | 23 |
| Oct 1 | 630 | 3100 | 1200 | 1900 | 940 | 98 | 260 | 29 |
| Oct 5 | 430 | 2200 | 1100 | 1500 | 830 | 55 | 180 | 20 |
| Oct 7 | 1200 | 2900 | 1000 | 2500 | 580 | 73 | 230 | 21 |
| Oct 13 | 350 | 1400 | 860 | 1200 | 520 | 94 | 180 | 16 |
| Average | 797 | 2517 | 1062 | 1775 | 700 | 86 | 208 | 23 |

Effluent Wastewater Characteristics
In mg/l

|  | TSS | COD | Soluble COD | BOD$_5$ | Soluble BOD$_5$ | Ammonia-N | TKN | Total P |
|---|---|---|---|---|---|---|---|---|
| Aug 19 | 10 | 110 | 75 | 24 | 15 | 22 | 30 | 4.1 |
| Aug 24 | 10 | 98 | 51 | 14 | 4.2 | 19 | 24 | 0.5 |
| Sep 2 | 10 | 66 | 51 | 17 | 5.9 | 15 | 15 | 1.5 |
| Sep 8 | 9 | 47 | 24 | 27 | 7.3 | 7.1 | 18 | 0.6 |
| Sep 17 | 9 | 86 | 51 | 16 | 5.3 | 6.7 | 11 | 3.2 |
| Sep 21 | 10 | 59 | 51 | 19 | 15 | 4.4 | 14 | 2.0 |
| Sep 23 | 8 | 66 | 47 | 16 | 9.1 | 4.8 | 16 | 1.7 |
| Sep 29 | 10 | 43 | 27 | 18 | 6 | 8 | 12 | 3.1 |
| Oct 1 | 10 | 51 | 51 | 9,4 | 10 | 5.4 | 12 | 3.9 |
| Oct 5 | 10 | 70 | 43 | 24 | 4.8 | 3.8 | 8.6 | 3.8 |
| Oct 7 | 5 | 66 | 35 | 2 | 2 | 3.9 | 4.3 | 2.3 |
| Oct 13 | 8.8 | 66 | 47 | 27 | 13 | 1.8 | 8.3 | 3.5 |
| Average | 9 | 69 | 46 | 18 | 8 | 8 | 14 | 3 |

Removal of Undesirable Constituents

| % | TSS | COD | Soluble COD | BOD$_5$ | Soluble BOD$_5$ | Ammonia-N | TKN | Total P |
|---|---|---|---|---|---|---|---|---|
| Aug 19 | 99 | 96 | 94 | 99 | 98 | 85 | 87 | 84 |
| Aug 24 | 99 | 97 | 95 | 99 | 99 | 84 | 87 | 97 |
| Sep 2 | 99 | 98 | 95 | 99 | 99 | 86 | 92 | 94 |
| Sep 8 | 99 | 98 | 97 | 98 | 98 | 87 | 91 | 97 |
| Sep 17 | 99 | 97 | 96 | 99 | 100 | 91 | 95 | 89 |
| Sep 21 | 99 | 97 | 95 | 99 | 98 | 93 | 93 | 90 |
| Sep 23 | 99 | 98 | 96 | 99 | 98 | 93 | 93 | 94 |
| Sep 29 | 98 | 98 | 97 | 99 | 99 | 90 | 94 | 87 |
| Oct 1 | 98 | 98 | 96 | 100 | 99 | 94 | 95 | 87 |
| Oct 5 | 98 | 97 | 96 | 98 | 99 | 93 | 95 | 81 |
| Oct 7 | 100 | 98 | 97 | 100 | 100 | 95 | 98 | 89 |
| Oct 13 | 97 | 95 | 95 | 98 | 98 | 98 | 95 | 78 |
| Average | 99 | 97 | 96 | 99 | 99 | 91 | 93 | 89 |

Thus, the system and processes of the instant invention perform wastewater treatment in a single vessel that includes all necessary treatment zones. The treatment zones are so configured as to interact and perform effective treatment of wastewater, including removal of undesirable and harmful nitrates and phosphorus. Advantages derived from the system and process of the invention, when compared to prior art systems and processes, include: a) a smaller plant footprint compared to systems using multiple vessels or spread-out ponds, b) simplified electrical operation of the single vessel system that has only 3 or optionally 4 motors, c) less tankage compared to multiple vessels or ponds, d) removal of undesirable nitrates in the single vessel, e) significant removal of undesirable phosphorus in the same vessel, f) less maintenance requirements due to the simplicity of the single vessel system, g) lower capital cost due to the simplicity of the single vessel system, h) co-treatment of solids and liquids as described, i) no chemical requirements for treatment and j) substantially fewer mechanical elements to adjust.

Definitions

Activated Sludge Process: An Activated Sludge Process is the process, wherein air or pure oxygen is added to the effluent coming from primary treatment. Under these conditions, a conglomerate of metabolizing microbes consisting of bacteria, fungi and protozoans, referred to as a floc, is visible.

Adenosine Triphosphate (ATP): A common energy-donating molecule in biochemical reactions, an important compound in transfer of phosphate groups.

Aerobic: (i) having molecular oxygen as a part of the environment. (ii) Growing only in the presence of molecular oxygen, as in aerobic organisms. (iii) Occurring only in the presence of molecular oxygen, as in certain chemical or biochemical processes such as aerobic respiration.

Anaerobic: (i) Absence of molecular oxygen. (ii) Growing in the absence of molecular oxygen, such as anaerobic bacteria. (iii) Occurring in the absence of molecular oxygen, as a biochemical process.

Anaerobic Respiration: Metabolic process whereby electrons are transferred from an organic, or in some cases, inorganic compounds to an inorganic acceptor molecule other than oxygen. The most common acceptors are nitrate, sulfate, and carbonate.

Anoxic: Literally meaning "without oxygen." An adjective describing a microbial habitat almost devoid of oxygen.

ATP (adenosine triphosphate): A common energy-donating molecule in biochemical reactions. It is also an important compound in transfer of phosphate groups.

Autotroph: An organism which uses carbon dioxide as the sole carbon source.

Autotrophic Nitrification: Refers to the oxidation of ammonium to nitrate through the combined action of two chemoautotrophic organisms, one forming nitrite from ammonium and the other oxidizing nitrite to nitrate.

Biochemical Oxygen Demand (abbreviated as BOD or BOD-5, the latter signifying a measurement over 5 days): Biochemical Oxygen Demand is an indirect measure of the biologically degradable organic matter in water. It refers to the amount of oxygen that would be consumed if all the organics in one liter of water were oxidized by bacteria and protozoa.

Bulking: Bulking is a condition commonly associated with an overabundance of filamentous bacteria such as *Sphaerotilus* and *Thiothrix*. The presence of these organisms causes the floc to be bulky, loosely compacted, thus preventing the floc from settling.

Carbon Cycle: A sequence where carbon dioxide is converted to organic forms by photosynthesis or chemosynthesis, recycled through the biosphere, with partial incorporation into sediments, and ultimately returned to its original state through respiration or combustion.

Catabolism: The biochemical processes involved in the breakdown of organic compounds, usually leading to the production of energy.

Chemical Oxygen Demand (COD): Chemical Oxygen Demand refers to an indirect measure of the amount of oxygen used by inorganic and organic matter in water. The measure is a laboratory test based on a chemical oxidant and, therefore, does not necessarily correlate with biochemical oxygen demand. It is the amount of oxygen, expressed in ppm or mg/l, consumed under specific conditions in the oxidation or organic and oxidizable inorganic matter contained in water.

Chemoautotroph: An organism that obtains energy from the oxidation of chemical, generally inorganic, compounds and carbon from carbon dioxide.

Chemolithotroph: An organism that obtains energy from the oxidation of inorganic compounds and uses inorganic compounds as electron donors.

Chemoheterotroph: An organism that obtains energy and carbon from the oxidation of organic compounds.

Denitrification (Dissimilatory Nitrate Reduction): The reduction of nitrate or nitrite to molecular nitrogen or nitrogen oxides by microbial activity (dissimilatory nitrate reduction) or by chemical reactions involving nitrite (chemical denitrification).

Dissimilatory Nitrate Reduction to Ammonium (DNRA): The use of nitrate by organisms as an alternate electron acceptor in the absence of oxygen resulting in the reduction of nitrate to ammonium.

Electron Acceptor: A substance that accepts electrons during an oxidation-reduction reaction. An electron acceptor is an oxidant.

Electron Donor: A substance that donates electrons in an oxidation-reduction reaction. An electron donor is a reductant.

Electron-Transport Chain: The final sequence of reactions in biological oxidations composed of a series of oxidizing agents arranged in order of increasing strength and terminating in oxygen.

Eutrophication: A several step process that results from a sudden harmful nutrient enrichment, followed by an explosive algal bloom. This bloom results in exhaustion of microharmful nutrients, resulting in an algal population crash. The decomposition of the dead algal biomass exhausts the dissolved oxygen in the water, precipitating fish kills.

Facultative Anaerobe: Organisms that do not require oxygen for growth but nonetheless grow better in its presence.

Facultative Organism: Organism that can digest hydrocarbons in both the presence and absence of Oxygen. Facultative organisms can live under aerobic or anaerobic conditions.

Heterotroph: An organism capable of deriving carbon and energy for growth and cell synthesis from organic compounds; generally also obtain energy and reducing power equivalents from organic compounds.

Heterotrophic Nitrification: The biochemical oxidation of ammonium to nitrite and nitrate by heterotrophic microorganisms.

Metabolism: All biochemical reactions in a cell, both anabolic and catabolic.

Microorganism (Microbe): A living organism too small to be seen with the naked eye (<0.1 mm); includes bacteria, fungi protozoa, microscopic algae, and viruses.

Nitrate Reduction (Biological): A process whereby nitrate is reduced by plants and microorganisms to ammonium for cell synthesis (nitrate assimilation, assimilatory nitrate reduction) or to various lower oxidation states ($N_2$, $N_2O$, $NO$) by bacteria using nitrate as the terminal electron acceptor in anaerobic respiration.

Nitrification: The biological oxidation of ammonium to nitrite and nitrate, or a biologically induced increase in the oxidation state of nitrogen.

Nitrifying Bacteria: Chemolithotrophs capable of carrying out the transformations from NH3 to NO2- or NO2- to NO3-.

Obligate Aerobe: Organisms that are dependent on oxygen for growth.

Obligate Anaerobe: Organisms that die in the presence of oxygen.

Oxidation: The process by which a compound gives up electrons, acting as an electron donor, and becomes oxidized.

Oxidation-Reduction (Redox) Reaction: A coupled pair of reactions, in which one compound becomes oxidized, while another becomes reduced and takes up the electrons released in the oxidation reaction.

pH: The negative logarithm of the hydrogen ion activity. The degree of acidity (or alkalinity) of a soil as determined by means of a glass or other suitable electrode or indicator at a specified moisture content or soil-water ratio, and expressed in terms of the pH scale.

P: Phosphorus

Phosphorus Cycle: The sequence of transformations undergone by phosphorus where it is transformed between soluble and insoluble, and organic and inorganic forms.

Poly-□-hydroxybutyrate (PHB): In order for the bacteria to more effectively remove phosphorus by "luxury" uptake under aerobic conditions, the bacteria must first be "conditioned" by exposure to an anaerobic environment containing a selected substrate. The substrate is anaerobically absorbed by the bacteria in the form of poly-□-hydroxybutyrate (PHB). The substrate is absorbed (but not metabolized) under anaerobic conditions by means of hydrolysis of ATP, which in turn provides energy for active transport of substrate into microorganisms for later use. The anaerobic hydrolysis of ATP (adenosine triphosphate) results in the release of a certain quantity of orthophosphate from the microorganisms, which is an indicator that the "luxury" uptake mechanism is in operation. The released orthophosphate is removed with the other orthophosphate indigenous in the wastewater as part of the "luxury" uptake occurring under aerobic conditions. "Luxury" uptake occurs through the metabolism of BOD under aerobic conditions. With the metabolism of BOD, ATP is derived from ADP (adenosine diphosphate). For each unit of ATP created, a unit of orthophosphate is removed from the wastewater.

Protozoan (plural, Protozoa): Unicellular eukaryotic microorganisms that move by either protoplasmic flow (amoebae), flagella (flagellates) or, cilia (ciliates). Most species feed on bacteria, fungi, or detrital particles TKN: Total Kjelhahl Nitrogen is the combination of NH3 and total organic nitrogen

*Zooglea*: A jelly-like matrix of microorganisms developed by bacteria, which is abundant in activated sludge flocs and trickling filter slimes.

Although the invention has been described with reference to a preferred embodiment, it will be appreciated that many variations and modifications may be made within the scope of the broad principles of the invention. Hence, it is intended that the preferred embodiments and all of such variations and modifications be included within the scope and spirit of the invention, as defined by the following claims.

The embodiments of the invention in which an exclusive property or privilege is claimed are defined hereafter.

What is claimed:

1. A process for treating wastewater containing liquid and solids, comprising the steps of: providing a process vessel for containing said liquid and solids; establishing a plurality of zones in an upper portion of said processing vessel including an aerobic zone, an anoxic zone and a clarification zone; feeding the wastewater into said processing vessel including said plurality of zones; maintaining aerobic conditions in said aerobic zone; maintaining anoxic conditions in said anoxic zone; maintaining clarification conditions in said clarification zone; maintaining a facultative zone in a middle portion of said process vessel below said aerobic zone, said anoxic zone and said clarification zone; maintaining an anaerobic zone in a lower portion of said processing vessel below said facultative zone; supplying air into said aerobic zone and creating an upflow in said aerobic zone; causing said upflow from said aerobic zone to create a downflow into said anoxic zone; causing a first portion of said downflow from said anoxic zone to pass into said upflow of said aerobic zone; causing a second portion of said downflow from said anoxic zone to create an upflow into said clarification zone; withdrawing substantially clarified liquid from said clarified zone; and causing settling of a portion of said solids from said plurality of zones into said anaerobic zone; and withdrawing substantially solids from about the bottom of said anaerobic zone.

2. The process as recited in claim 1 including feeding said wastewater into about the top of said aerobic zone.

3. The process as recited in claim 1, wherein said anoxic zone is annularly disposed about said aerobic zone.

4. The process as recited in claim 1 wherein said clarification zone is annularly disposed about said anoxic zone.

5. The process as recited in claim 1 further including the step of feeding air into at about the bottom of said aerobic zone.

6. The process as recited in claim 1 further including the step of withdrawing substantially said clarified liquid from about the top of said clarification zone.

7. A process for treating wastewater containing liquid and solids, comprising:
 (a) providing a multi-zone vessel;
 (b) providing a feedwater inlet for feeding wastewater into said vessel;
 (c) creating in an upper portion of said vessel (i) an aerobic zone in the center of said upper portion, (ii) an anoxic zone contiguous to said aerobic zone, and (iii) a clarification zone for clarified liquid contiguous to said anoxic zone;
 (d) establishing upflow conditions in said aerobic zone;
 (e) providing a first passage for enabling said upflow conditions from said aerobic zone to pass into the downflow of said anoxic zone;
 (f) providing a second passage for enabling at least a portion of the downflow from said anoxic zone to pass into establish upflow conditions in said clarification zone;
 (g) providing a third passage for enabling at least a portion of the downflow conditions from said anoxic zone to pass into the upflow conditions of said aerobic zone;
 (h) providing an air inlet for feeding air into said aerobic zone;
 (i) establishing a facultative zone in said vessel disposed below said aerobic zone;
 (j) establishing an anaerobic zone in said vessel at a level substantially below said aerobic zone;
 (k) providing a clarified liquid effluent outlet in said vessel for withdrawing substantially clarified liquid from said upflow of said clarification zone;
 (l) providing a substantially solids outlet disposed at about the bottom of said anaerobic zone;
 (m) supplying said wastewater into said vessel through said feedwater inlet;

(n) supplying air into said system through said air inlet;
(o) effecting settling of solids into said anaerobic zone;
(p) withdrawing substantially solids from said system through said substantially solids outlet; and,
(q) withdrawing said clarified liquid from said upflow of said clarification zone through said clarified liquid effluent outlet.

8. The process as recited in claim 7 further comprising feeding said wastewater into about the upper portion of said aerobic zone through said feedwater inlet.

9. The process as recited in claim 7 further comprising feeding said wastewater into about the lower portion of said aerobic zone through said feedwater inlet.

10. The process as recited in claim 7 wherein said anoxic zone is annularly disposed about said aerobic zone.

11. The process as recited in claim 7 wherein said clarification zone is annularly disposed about said anoxic zone.

12. The process as recited in claim 7 further comprising feeding air into at about the bottom of said aerobic zone.

13. The process as recited in claim 7 further comprising withdrawing said clarified liquid from about the top of said clarification zone.

14. The process as recited in claim 7 further comprising withdrawing substantially solids from about the bottom of said anaerobic zone.

15. A method for wastewater treatment comprising the steps of: providing first cylindrical barrier means to establish an aerobic zone located in the center of a single treatment vessel supplied with effluent; introducing air into the bottom of said aerobic zone to create aerobic conditions and creating an upflow through said aerobic zone; employing said aerobic zone for aerobic processing, including breaking down long carbon compound chains and oxidizing volatile fatty acids; providing a second cylindrical barrier means surrounding and spaced from said first cylindrical barrier means to establish an anoxic zone; means for transferring a portion of said upflow in said aerobic zone to said anoxic zone for anoxic processing; creating a downflow in said anoxic zone; merging a portion of said downflow from said anoxic zone into said upflow in said aerobic zone; interacting said aerobic processing and said anoxic processing in said aerobic zone through said merging for removing nitrates produced from said aerobic processing; providing a clarification zone in said vessel surrounding said anoxic zone; drawing a portion of said downflow from said anoxic zone into said upflow in said clarification zone; discharging clarified liquid from said clarification zone; creating a facultative transition zone below said aerobic zone, said anoxic zone and said clarification zone; using anaerobic conditions below said facultative transition zone to create an anaerobic zone to absorb settled solids gravitating from said aerobic zone, said anoxic zone, said clarification zone and said facultative zone; employing said anaerobic zone for anaerobic processing, including synthesis of said settled solids into said volatile fatty acids; dispersing said volatile fatty acids into said aerobic zone; causing the removal of phosphorus through said aerobic processing interacting with said anaerobic processing in said anaerobic zone; collecting sludge that settles from said aerobic zone, said anoxic zone, said clarification zone, said facultative zone and said anaerobic zone; and discharging said sludge from the bottom of said vessel.

16. The method as recited in claim 15 further comprising the addition of a beneficial biological nutrient to said influent.

17. A single vessel system for treating wastewater, comprising: vessel means; a source of wastewater; a plurality of upper treatment zones in said vessel means including an aerobic zone, disposed in the upper center portion of vessel means, an anoxic zone annularly disposed about said aerobic zone, a clarification zone annularly disposed about said anoxic zone; an inlet for feeding said wastewater into said vessel means including said upper treatment zones; first fluid flow inducing means for creating upflow fluid conditions in said aerobic zone; second fluid flow inducing means for creating downflow fluid conditions in said anoxic zone; third fluid flow inducing means for creating upflow fluid conditions in said clarification zone; a first passage fluidly interconnecting said anoxic zone with said clarification zone for enabling at least a portion of said downflow fluid conditions from said anoxic zone to pass into said upflow fluid flow conditions of said clarification zone; a second passage fluidly interconnecting said anoxic zone and said aerobic zone for enabling at least a portion of said downflow fluid conditions from said anoxic zone to pass into said upflow fluid conditions of said aerobic zone; a third passage fluidly interconnecting said aerobic zone and said anoxic zone for enabling said upflow fluid conditions from said aerobic zone to pass into said downflow fluid conditions of said anoxic zone; a facultative zone in said vessel means disposed in vessel means at a level below said aerobic zone; an anaerobic zone in said vessel means disposed below said facultative zone; a sludge zone disposed in the bottom of said vessel means; an air source; air outlet means for feeding air from said air source into said aerobic zone; a liquid effluent outlet for withdrawing said clarified liquid from said clarification zone; and a sludge removal facility disposed at about the bottom of said anaerobic zone for facilitating the discharge of substantially solids.

18. The system as recited in claim 17, wherein said sludge removal facility is a sludge rake for facilitating said discharge of substantially solids.

19. The system as recited in claim 17, wherein said air source is an oxygenation blower for enabling said feeding of air into said aerobic zone.

20. The system as recited in claim 17, wherein said feedwater source for said feeding of said wastewater into said system is a lifting station.

21. The system as recited in claim 17, further comprising a substantially cylindrical baffle annularly disposed in said vessel means for separating said aerobic zone from said anoxic zone.

22. The system as recited in claim 17, further comprising a substantially cylindrical baffle annularly disposed in said vessel means for separating said anoxic zone from said clarification zone.

23. The system as recited in claim 17, further comprising a nutrient dosing pump for adding beneficial biological nutrient to said inlet for said feeding of said wastewater into said vessel means.

* * * * *